(12) United States Patent
Lanser

(10) Patent No.: US 7,159,499 B1
(45) Date of Patent: Jan. 9, 2007

(54) OPERATIONAL SUPPORT FOR PORTABLE BAND SAW

(76) Inventor: Jerry L. Lanser, 2518 Cambridge Dr., Longmont, CO (US) 80501

(*) Notice: Subject to any disclaimer, the term of this patent is extended or adjusted under 35 U.S.C. 154(b) by 92 days.

(21) Appl. No.: 10/331,722

(22) Filed: Dec. 30, 2002

(51) Int. Cl.
B23D 55/02 (2006.01)
B26D 7/26 (2006.01)
B27B 13/04 (2006.01)

(52) U.S. Cl. .............. 83/796; 83/574; 83/788; 83/809; 83/812

(58) Field of Classification Search ............. 83/574, 83/788, 799, 801, 809–812, 794, 796, 797, 83/798, 813; 30/380
See application file for complete search history.

(56) References Cited

U.S. PATENT DOCUMENTS

| | | | |
|---|---|---|---|
| 2,555,056 A * | 5/1951 | Pence | 83/798 |
| 2,711,195 A * | 6/1955 | Hill | 83/788 |
| 3,385,330 A | 5/1968 | Haynes | 83/799 |
| 3,452,629 A * | 7/1969 | Jacobson | 83/812 |
| 3,566,731 A | 3/1971 | Ensley | 83/798 |
| 3,799,024 A | 3/1974 | Alexnader | 83/798 |
| 3,815,465 A * | 6/1974 | Smierciak | 83/799 X |
| 3,952,622 A * | 4/1976 | Majus | 83/799 |
| 4,127,046 A * | 11/1978 | Jackson | 83/799 |
| 4,208,937 A * | 6/1980 | Marshall | 83/799 |
| 4,283,980 A * | 8/1981 | Jackson | 83/798 |
| 4,350,067 A * | 9/1982 | Picard | 83/796 |
| 4,677,887 A * | 7/1987 | Martin | 83/788 |
| 4,823,666 A | 4/1989 | Galloway | 83/788 |
| 5,251,525 A | 10/1993 | Galloway | 83/574 |
| 5,404,779 A * | 4/1995 | Break | 83/471.3 |

OTHER PUBLICATIONS

Grainger Calalogue, p. 999, date unknown.
Milwaukee Portable Band Saw Table, Catalogue entry, page and date unknown.

* cited by examiner

Primary Examiner—Clark F. Dexter
(74) Attorney, Agent, or Firm—Harold A. Burdick

(57) ABSTRACT

Apparatus and methods for operational support and guidance of pivoting movement of portable band saws are disclosed. The apparatus includes a pivoting mount maintained at a work surface. A support is connected with the mount and includes a forward bracket adjacent to the mount for receiving a front portion of a blade housing structure of the portable band saw. An extension bar of the support supports a rear portion of the blade housing structure, a securing latch at the extension provided to releasably maintain the rear portion of the blade housing structure supported thereat.

20 Claims, 5 Drawing Sheets

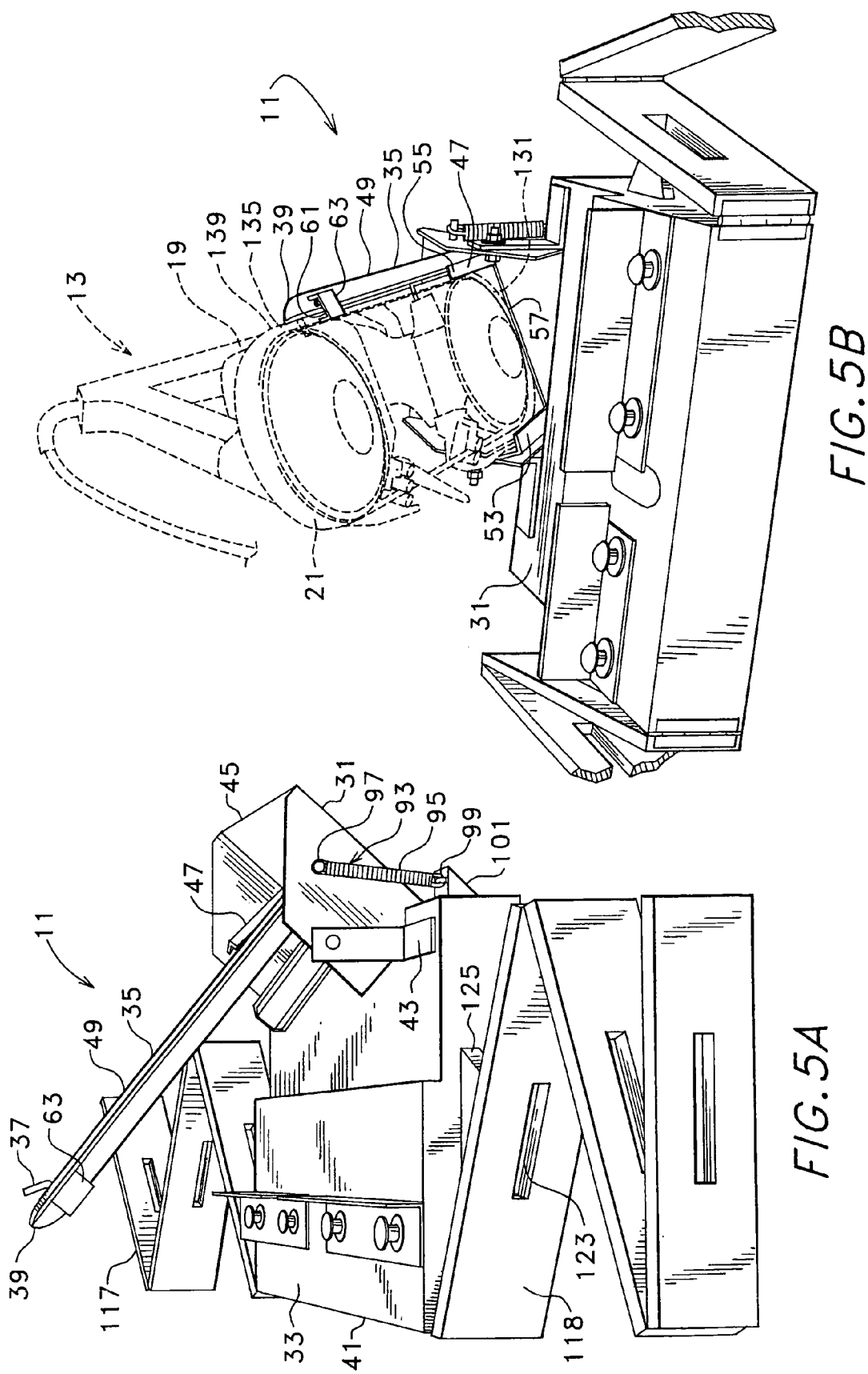

OPERATIONAL SUPPORT FOR PORTABLE BAND SAW

FIELD OF THE INVENTION

This invention relates to apparatus and methods for supporting and/or guiding hand held power tools, and, more particularly, relates to such apparatus and methods for portable band saws.

BACKGROUND OF THE INVENTION

Various structures have been heretofore suggested and/or utilized for conversion of normally hand held and operated power tools to table mounted and guided tools. Such tools have included mounts for operation of hand held drill motors in drill press-like structures and table mounts for hand held routers, jig saws and the like. Such structures typically include a deck (work surface) together with a tool mounting mechanism.

More particularly, such structures have heretofore been suggested and/or utilized for application with portable band saws, electrically powered hand tools having a gear driven flexible blade and motor held at a frame body including a case having a blade housing and a handle (see, for example, U.S. Pat. Nos. 5,251,525 and 4,823,666 which show a structure for converting such band saws to upright table saws, and the no. 48-08-0260 portable band saw table from Milwaukee, the nos. 3JF38 and 3JF39 Porta-Band Stands from Porter Cable, all three of which are used for supporting pivoting, horizontal, operations).

Such heretofore known and/or utilized structures for conversion of hand held and operated band saws to table mounted and guided tools, and particularly those adapted for supporting pivoting saw movement, have, however, typically been configured only for use with one particular brand of tools, have required modification of the band saw housing, have not provided structure rigorous enough to support repeated, consistent cuts, and/or have left the band saw blade susceptible to jamming or binding during band saw use. Moreover, such structures have typically not provided adequate work surface stability absent provision by the user of additional support structure. Further improvements could thus still be utilized in such structures for supporting and guiding pivoting movement during operation of portable band saws.

SUMMARY OF THE INVENTION

This invention provides apparatus and methods for operational support and guidance of pivoting movement of portable band saws. The apparatus is adapted for use with a variety of different manufacturer's tools with no tool modification required, and provides tool support and guidance enabling repeated, consistent material cuts with a minimum of occurrences of band saw blade jamming or binding during band saw use.

The apparatus is adapted for operationally supporting a portable band saw having a case including a blade housing structure. The apparatus includes a pivot maintained adjacent to a work surface and having a support connected therewith. The support has a bracket for receiving a front portion of the blade housing structure and an extension for supporting a rear portion of the blade housing structure. A securement at the extension of the support is provided to releasably maintain the rear portion of the blade housing structure supported thereat.

The work surface is preferably defined by a work station of the apparatus, the pivot including a mount pivotably supported at the work station and having a rear wall with a slot therein. The support is adjustably maintained at the rear wall of the mount so that attitude of the support (relative to the work surface) is selectable along the slot in the mount rear wall and maintainable once selected. The bracket of the support includes opposed channels each for receiving and supporting an opposite side of the front portion of the blade housing structure of the band saw.

Work surface stability may be enhanced at the work station by provision of foldable work station stabilizing arms selectively extendible at the work station.

The method of this invention includes the steps of providing a pivot at a work surface and wedging the front portion of the blade housing structure at a support adjacent to the pivot. The rear portion of the blade housing structure is supported at an extension of the support, location thereof releasably secured. Thereafter, operation and pivoting movement of the band saw relative to the work surface is conducted manually by the user using the usual band saw accouterments (handle, on/off switch, and so forth).

It is therefore an object of this invention to provide improved operational support apparatus and methods for portable band saws.

It is another object of this invention to provide operational support apparatus and methods for portable band saws adapted for use with a variety of different manufacturer's tools with no tool modification required.

It is another object of this invention to provide operational support apparatus and methods for portable band saws that provide tool support and guidance enabling repeated, consistent material cuts with a minimum of occurrences of band saw blade jamming or binding during band saw use.

It is still another object of this invention to provide operational support apparatus and methods for portable band saws that additionally provides enhanced work surface stability without provision by the user of additional support structure.

It is yet another object of this invention to provide an apparatus for operational support at a work surface of a portable band saw having a case including a blade housing structure, the apparatus including a pivot maintained adjacent to the work surface, a support connected with the pivot and including a bracket for receiving a front portion of the blade housing structure of the band saw therein and an extension for supporting a rear portion of the blade housing structure of the band saw, and a securement at the extension of the support for releasably maintaining the rear portion of the blade housing structure supported thereat.

It is yet another object of this invention to provide an apparatus for operational support and guidance of pivoting movement of portable band saw having a case including a blade housing structure, the apparatus comprising a work station, a mount pivotably supported at the work station and including a rear wall having a slot therein, and a support adjustably maintained at the rear wall of the mount with a portion operative relative to the slot so that attitude of the support is selectable and maintainable once selected, the support including opposed channels each for receiving and supporting an opposite side of a front portion of the blade housing structure of the band saw therein and an extension for supporting a rear portion of the blade housing structure of the band saw.

It is still another object of this invention to provide a method of pivotable operational support of a portable band saw having a case including a blade housing structure, the method comprising the steps of providing a pivot at a work surface, wedging a front portion of the blade housing structure of the band saw at a support adjacent to the pivot, supporting a rear portion of the blade housing structure at an extension of the support, and releasably securing location of the supported rear portion of the blade housing structure, whereby manually moving the band saw actuates pivoting movement relative to the work surface.

With these and other objects in view, which will become apparent to one skilled in the art as the description proceeds, this invention resides in the novel construction, combination, and arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIGS. 5A through 5D are perspective views illustrating use of the apparatus of this invention.

DESCRIPTION OF THE INVENTION

Figure 1:
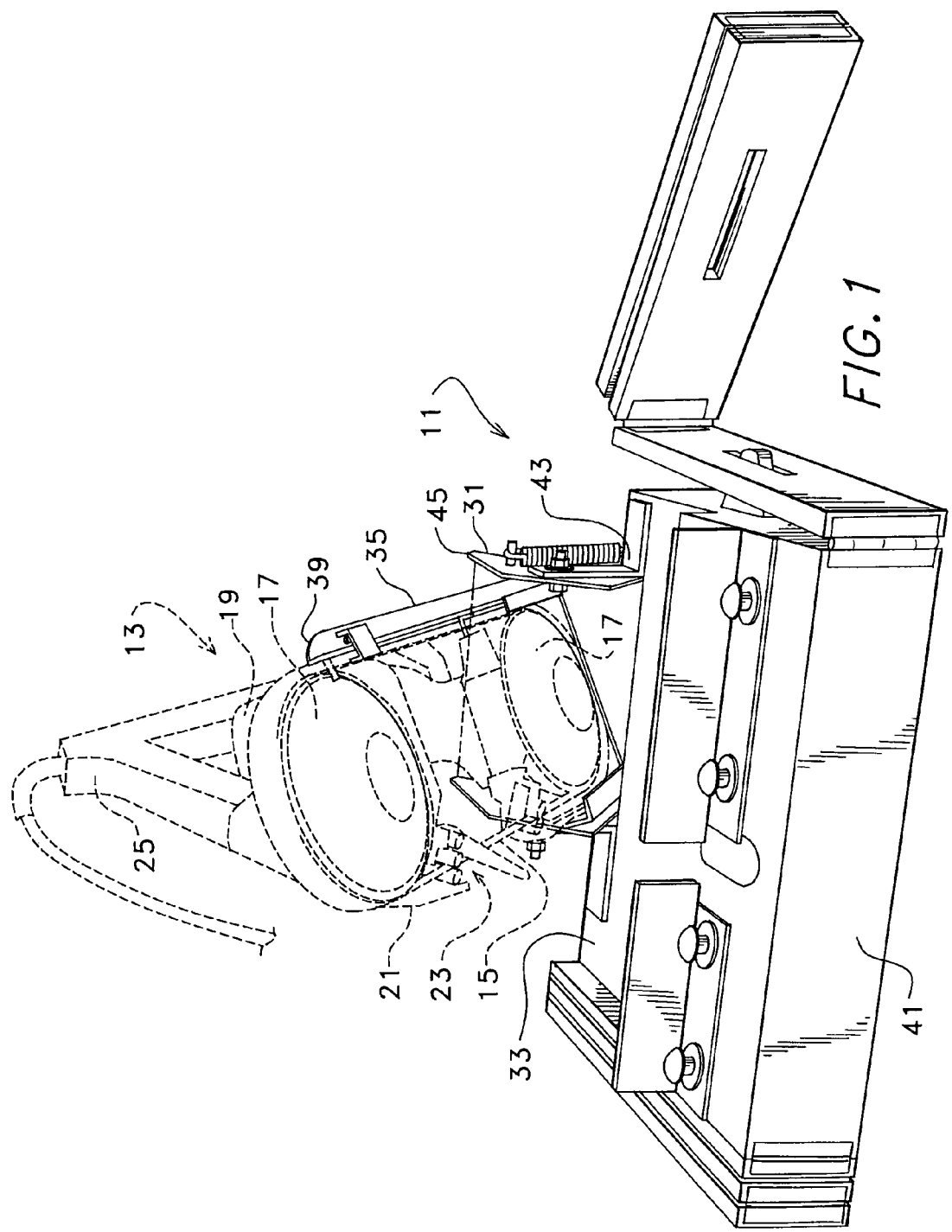
FIG. 1 is a perspective view of the apparatus for operational support and guidance of pivoting movement of portable band saws of this invention.
Figure 2:
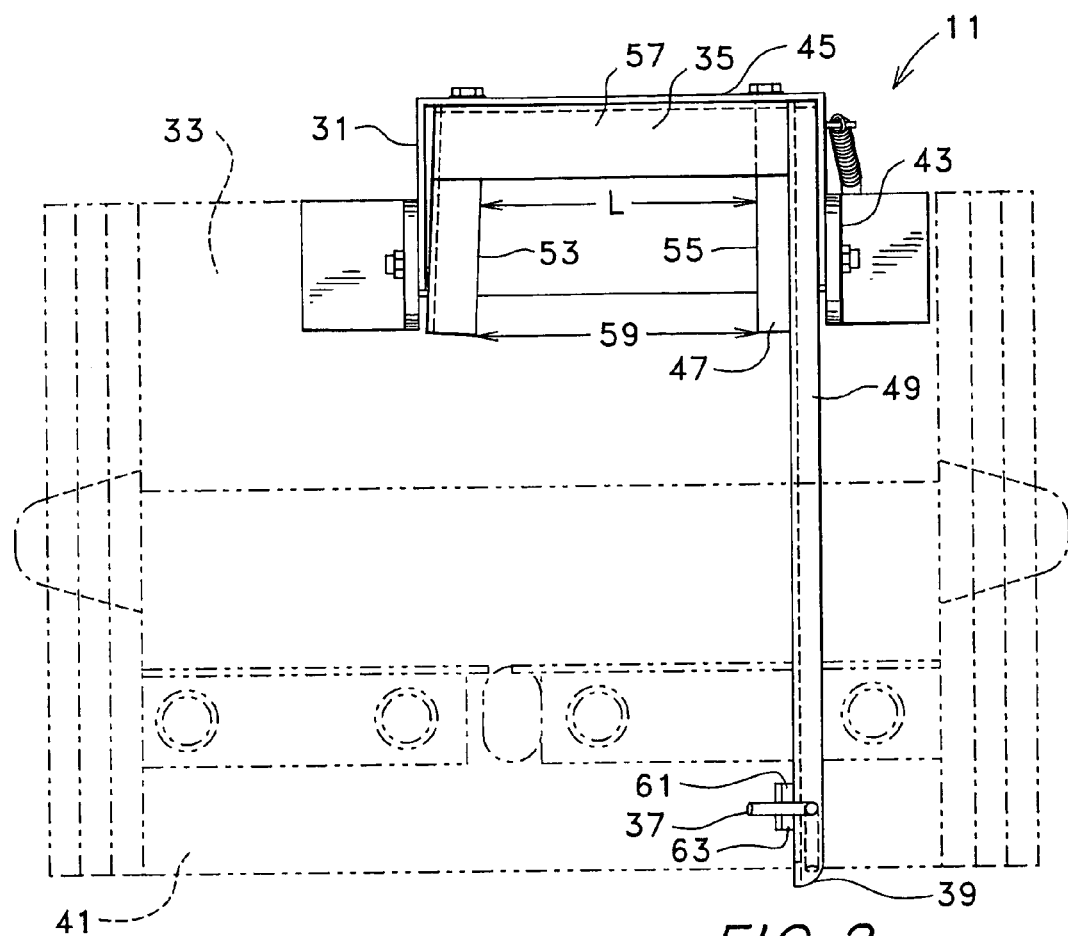
FIG. 2 is a top view of the support and pivot components of the apparatus shown in FIG. 1.

The apparatus of this invention will be described with reference to the FIGURES. Turning first to FIGS. 1 through 4, apparatus 11 is adapted for support and guidance of pivoting movement of a portable band saw 13. Such band saws typically include a flexible, endless blade 15 maintained around drive gears 17 and a case 19 housing the electric drive motor/drive train and including a blade housing/guard structure 21 (surrounding blade 15 except at open portion 23 adapted for saw operations access) and a handle 25 (typically having an on/off trigger switch thereat), all as illustrated in FIG. 1.

Apparatus 11 includes pivot 31 at work surface (deck) 33 and support 35 with securement latch 37 at the distal end 39 thereof. Work surface 33 may or may not be provided by apparatus 11, but preferably is the top surface of work station 41 of the preferred embodiment of apparatus 11. Pivot 31 includes upright pair 43 and mount bracket 45, support 35 including bracket 47 connected with mount bracket 45 and extension bar 49 connected to (by welding, brazing, bolts, rivets or the like) to bracket 47. Alternative means may be utilized, pivot 31 in particular being achievable using any means allowing rotational movement of support 35 relative to work surface 33.

Extension bar 49 is preferably made of angle metal. Bracket 45 is preferably made of channel metal including opposed side channels 53 and 55 and end channel 57 welded or otherwise connected to form a unshaped bracket slightly wider at opening 59 between side channels 53 and 55 than at the length L (FIG. 2) of end channel 57. The parts of pivot 31 should also be made of sturdy material such a metal (iron and the like).

Retaining slot 61 at distal end 39 of extension bar 49 of support 35 is defined by channel metal section 63 attached (welded or the like) to the underside of bar 49 (see FIG. 5B) at a position adjacent to securement latch 37.

Figure 3:
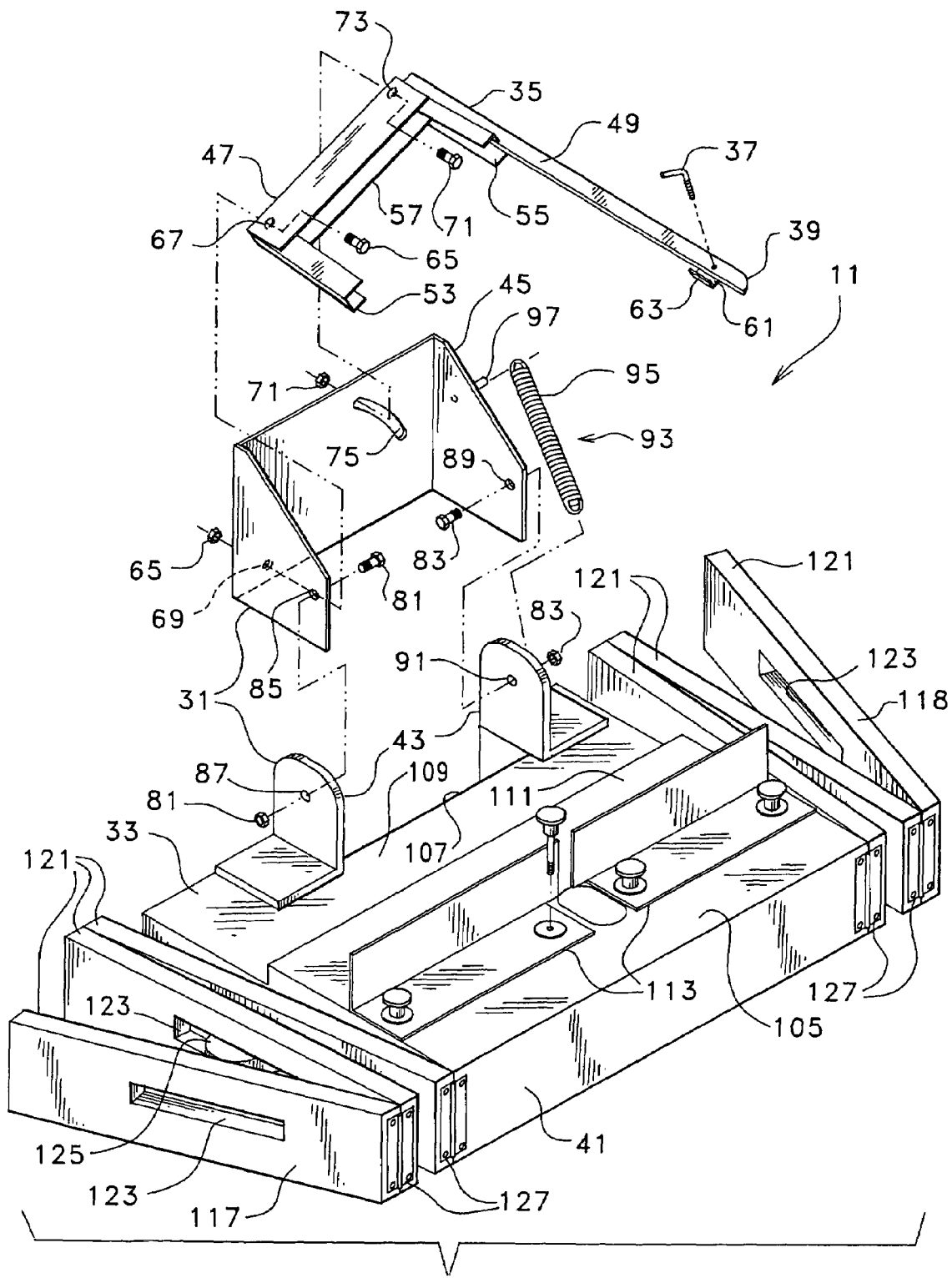
FIG. 3 is an exploded perspective view of the apparatus shown in FIG. 1.

Turning to FIG. 3, bracket 47 of support 35 is held at mount bracket 45 of pivot 31 by bolt/nut combination 65 through holes 67 and 69 of brackets 47 and 49, respectively, and bolt/nut combination 71 through hole 73 and arcuate adjustment slot 75 of brackets 47 and 45, respectively. This cooperative structure allows the attitude of support 35, relative to surface 33, to be adjusted by selection of the position of hole 73 along slot 75 to select the degree of tilt of support 35, the position of support 35 being maintained once selected by tightening of bolt/nut combination 71. In this manner, band saws of different styles and angle of cut are accommodated by a single tool.

Mount bracket 45 of pivot 31 is pivotable at upright pair 43 on bolt nut combinations 81 and 83 through holes 85/87 and 89/91, respectively. Counterbalance mechanism 93 is provided to maintain support 35 having a band saw 13 held therein at any selected pivot location along the arc of pivoting movement of the saw in apparatus 11 without further intervention from a user (i.e., the user may release the saw in support 35 at any location along the arc of travel and the saw will not change position after release). Mechanism 93 includes spring 95 mounted at one end on pin 97 at mount bracket 45 and at its other end to clip 99 at extension block 101 of work station 41 (see FIG. 5A). While spring 95 is shown to accommodate counterbalance, other means could be utilized, including a torsion spring or springs at pivot 31, counterweights or the like.

Where provided with apparatus 11, work station 41 includes work surface body 105 having work surface 33 at the top surface thereof. Body 105 may be any shape, but, where utilized as shown with mount bracket 45 of pivot 31, must include cut away portion 107 to allow for bracket 45 travel during saw use. Work surface 33 is preferably a two tier surface 109 and 111 allowing blade 15 of band saw 13 adequate clearance for cutting. Fence mechanism 113 is provided at surface 111 and is adjustable relative to support 35 to accommodate different selected cut angles of a work piece held against the fence (as is known and widely utilized for other table saw-type arrangements).

Figure 4:
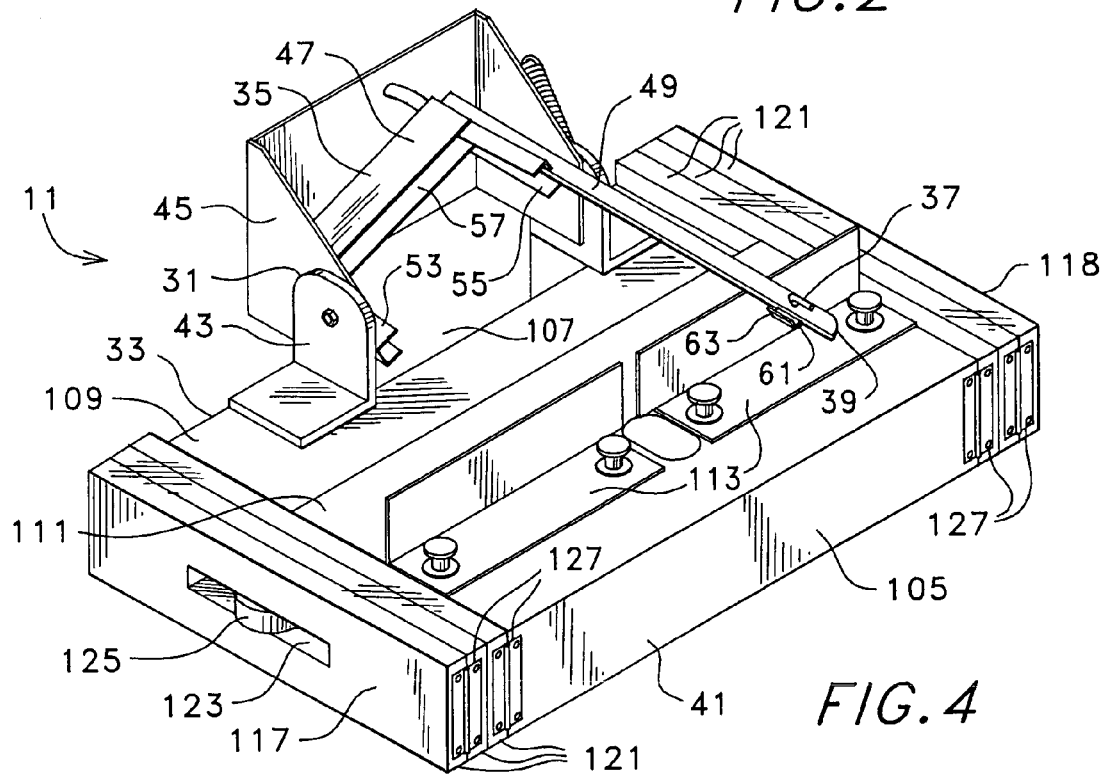
FIG. 4 is a perspective view of the apparatus of FIG. 1 shown is its stored configuration.

Means for enhancing work surface stability (including stability of a work piece thereat) by selectively extending the base of work station 41 is provided by foldable arms 117 and 118 at each side of body 105. Arms 117/118 each include a plurality of foldable section 121 having retention slots 123 therethrough (for securement in storage on ears 125 extending from body 105), sections 121 pivotably connected to each other and body 105 by hinges 127 (see FIGS. 3 and 4). Latching mechanisms for maintaining arms 117/118 and support 35 in stored positions (as shown in FIG. 4) may be provided (not shown).

Use and operation of apparatus 11 is illustrated in FIGS. 4 and 5A through 5D. From its stored configuration (FIG. 4), apparatus 11 is set up at a work site by connecting counterbalance mechanism 93, selecting the degree of tilt for support 35 (and thus saw 13) needed to accommodate blade presentation of a particular band saw perpendicular to work surface 33 by adjustment at slot 75 (see FIGS. 4 and 5D), and extending the base of work station 41 as desired by extension of arms 117/118 (where provided, see FIG. 5A).

Portable band saw 13 is held at support 35 by wedging the front portion 131 of blade housing structure 21 of case 19 in and between channels 53 and 55 of bracket 47 of support 35, the front edge thereof lodging at channel 57 of bracket 47. Rear portion 135 of blade housing structure 21 is supported in slot 61 at distal end 39 of extension bar 49 and securement latch 37 is rotated over top surface 139 of rear portion 135 to hold saw 13 thereat between latch 37 and slot 61 to thus maintain location of rear portion 135 during cutting operations (see FIGS. 5B and 5D). These operations are reversed to remove saw 13 (for ordinary use) from apparatus 11 and reorient apparatus 11 for storage, and no tools are required for either of these operations.

Figure 5C:
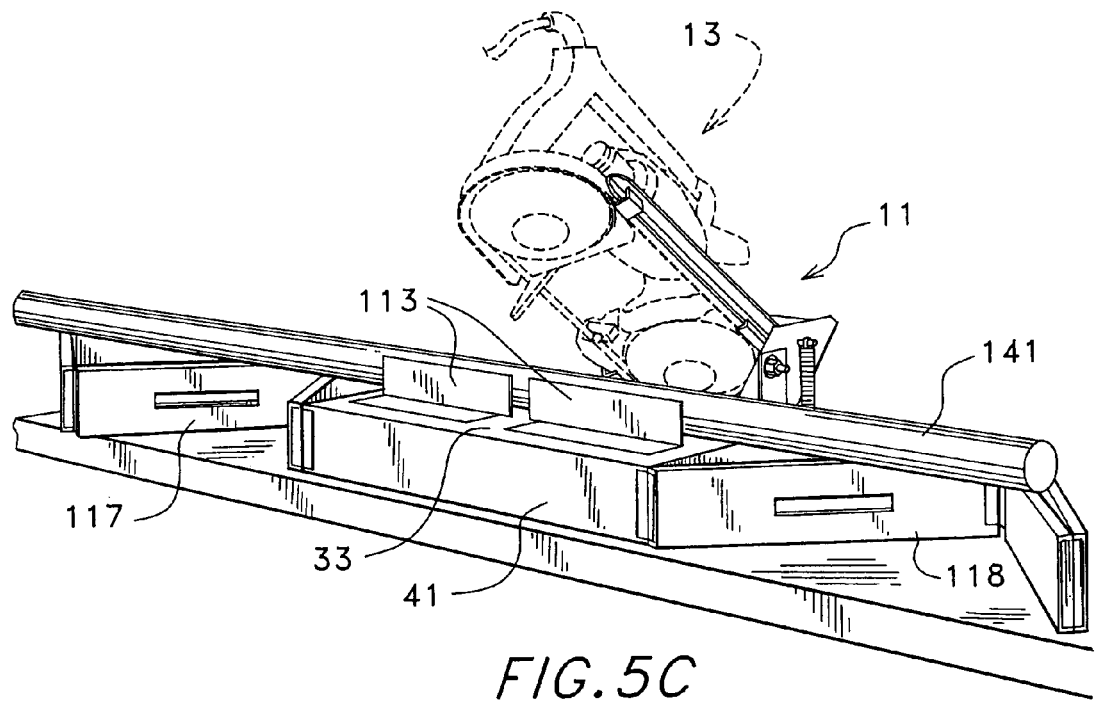
Figure 5D:
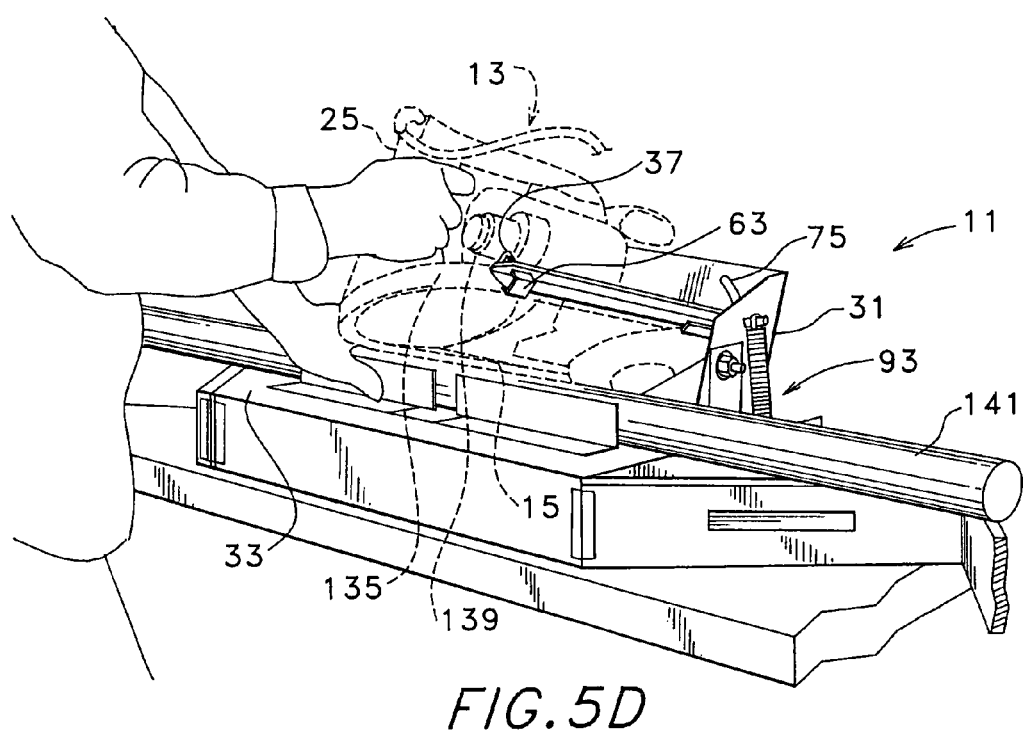

Fence mechanism 113 is adjusted for the desired cut angle and work piece 141 is then held against fence mechanism 113, arms 117 and 118 utilized for additional work surface providing added work piece support when necessary (see FIG. 5C). The user then may make a cut by grasping handle 25 of saw 13, activating the saw, and moving the saw guided by pivot 31 toward work piece 141 until blade 15 engages the work piece and completes the cut (see FIG. 5D). Saw 13 may be raised by movement thereof in the opposite direction, or may be left in the lowered position, after the cut is made.

As may be appreciated from the foregoing, improved apparatus and methods are provided for operational support and guidance of pivoting movement during use of a portable band saw. The apparatus is quite simple and safe to use, provides for accurate and repeatable cuts, and is adaptable for use with a variety of portable band saws by different manufacturers.

What is claimed is:

1. An apparatus for operational support of a portable band saw at a work surface, the portable band saw including a case and a blade housing structure having a front portion and a rear portion, the apparatus comprising:
   a pivot including a mount wall having first and second spaced openings therethrough;
   a support including a bracket having first and second spaced openings therethrough, said bracket for releasably receiving the front portion of the blade housing structure of the band saw therein and an extension for supporting the rear portion of the blade housing structure of the band saw, said bracket including first and second spaced support structures each configured for releasably receiving and supporting the front portion of the blade housing structure of the band saw without modification of the blade housing structure to accommodate support; and
   first and second connecting means, said first connecting means for location through said first openings of said mount wall of said pivot and said bracket of said support to connect said support to said pivot with said second openings of said mount wall of said pivot and said bracket of said support positionable adjacent to one another, said second connecting means for location through said second openings in said mount wall of said pivot and said bracket of said support, at least one of said second openings configured as an adjustment slot accommodating movement of said second openings relative to one another for adjustability of tilt of said bracket of said support relative to the work surface, securement at a selected tilt maintained by said second connecting means.

2. The apparatus of claim 1 wherein said first and second spaced support structures of said bracket of said support comprise opposed channels each adjacent to a different one of said first and second openings through said bracket and each positioned to receive and support an opposite side of the front portion of the blade housing structure.

3. The apparatus of claim 1 further comprising a securement at said extension of said support for releasably maintaining the rear portion of the blade housing structure supported thereat for movement with said support.

4. The apparatus of claim 3 wherein said securement is pivotably mounted at said extension of said support for movement between latched and opened positions.

5. The apparatus of claim 1 further comprising counterbalance means for maintaining said support, and thus the band saw, at any selected pivot location without further user intervention.

6. The apparatus of claim 1 wherein said pivot includes an upright, said mount wall pivotably connected with said upright.

7. The apparatus of claim 1 wherein said extension of said support includes a bar connected with said bracket and having a retainer at a distal end thereof to hold the rear portion of the blade housing structure.

8. An apparatus for operational support and guidance of pivoting movement of a portable band saw, the portable band saw including a case and a blade housing structure, said apparatus comprising:
   a work station;
   a mount pivotably supported at said work station and including a rear wall having a slot therein; and
   a support adjustably maintained at said rear wall of said mount with a portion operably associated with said slot so that attitude of said support is selectable and maintainable once selected, said support including opposed channels each for receiving and supporting an opposite side of a front portion of the blade housing structure of the band saw therein and an extension for supporting a rear portion of the blade housing structure of the band saw.

9. The apparatus of claim 8 wherein said slot is arcuate, said apparatus further comprising a latch located at a distal end of said extension of said support for releasably securing the rear portion of the blade housing structure supported thereat.

10. The apparatus of claim 9 wherein said extension includes a retaining slot at said distal end of said extension adjacent to said latch for receiving a bottom edge of the rear portion of the blade housing structure, said latch moveable over a top surface of the rear portion of the blade housing structure.

11. The apparatus of claim 8 wherein said work station includes a work surface body and foldable work station stabilizing arms selectively extendible from said work surface body.

12. The apparatus of claim 8 wherein said work station includes locating means at a work surface for selective positioning of a work piece to be cut.

13. The apparatus of claim 8 further comprising a counterbalance spring connected between said mount and said work station adapted for maintenance of said support, and thus the band saw, at any selected pivot location without further user intervention.

14. A pivotable band saw apparatus comprising:
   a case housing drive means for operation of a band saw blade, said case including a blade housing structure having a front portion and a rear portion and having a handle extending therefrom adjacent to said rear portion of said blade housing structure;
   a pivot including a pivotable mount having a rear wall;

a support including a front bracket, said support maintained at said pivot and configured for releasably engaging said blade housing structure, said front bracket including first and second adjacent support channels, each of said support channels configured for releasably receiving and supporting a different side of said front portion of said blade housing structure of said case without modification of the blade housing structure to accommodate support so that said front portion of said blade housing structure is releasably held adjacent to said pivot; and tilt selection structure associated with said pivot and said support for user selection of degree of tilt of said support, one part of said tilt selection structure comprising an arcuate slot formed in said rear wall of said mount and another part of said tilt selection structure comprising an opening formed at said front bracket of said support.

15. The apparatus of claim 14 further comprising means for balancing location of said support during use of said apparatus, said means for balancing location of said support including a counterbalance spring connected with said pivot.

16. The apparatus of claim 14 wherein said support includes an extension for supporting said rear portion of said blade housing structure of said case.

17. The apparatus of claim 14 further comprising a releasable securement engageable at said parts of said tilt selection structure.

18. The apparatus of claim 14 wherein said pivot includes an upright having said mount movably connectable therewith.

19. The apparatus of claim 14 further comprising locating means at a work surface, for position maintenance of a work piece to be cut at said work surface during cutting operations.

20. The apparatus of claim 14 further comprising a work surface including includes a selectively extendible base.

* * * * *